United States Patent [19]
de Beixedon

[11] 3,803,744
[45] Apr. 16, 1974

[54] FISHING POLE DEVICE

[76] Inventor: Philip C. de Beixedon, 213 W. Canon Perdido St., Santa Barbara, Calif. 93101

[22] Filed: Oct. 11, 1972

[21] Appl. No.: 296,665

[52] U.S. Cl. ................................................. 43/15
[51] Int. Cl. ............................................ A01k 97/00
[58] Field of Search .................................. 43/15, 25

[56] References Cited
UNITED STATES PATENTS
| | | | |
|---|---|---|---|
| 2,824,404 | 2/1958 | Booth | 43/15 |
| 2,552,516 | 5/1951 | Camp et al. | 43/15 |
| 2,650,448 | 9/1953 | Lichtig | 43/25 |

Primary Examiner—Robert Peshock
Assistant Examiner—Daniel J. Leach
Attorney, Agent, or Firm—Lyon & Lyon

[57] ABSTRACT

An automatic hook setting device comprising a pair of pivoted jaws mounted on a fishing pole adapted to engage each other. A tension line is secured to one of the jaws and to the pole tip in a manner to bend the pole and the engagement of the jaws holds the pole in bent position. A slotted block is carried by the other jaw to releasably grip the fishing line extending from the reel. A pull by a fish on the line causes the jaw with the block thereon to pivot and become disengaged from the first jaw, thus allowing the pole tip to spring up and hook the fish.

8 Claims, 4 Drawing Figures

PATENTED APR 16 1974 3,803,744

FISHING POLE DEVICE

BACKGROUND OF THE INVENTION

This invention relates to an attachment for a fishing pole which uses the resiliency of the pole to automatically set the hook whenever the bait is pulled on by a fish. It can be used on any pole without interfering with the reel or the normal use of the pole. It also includes means whereby the amount of pull necessary to trip the device may be adjusted.

It is a feature of this invention that it is simple, economical to make, easily installed and easy to use.

These and other features, objects and advantages from the ensuing detailed description in which.

DESCRIPTION OF THE PREFERRED EMBODIMENT

Figure 1:
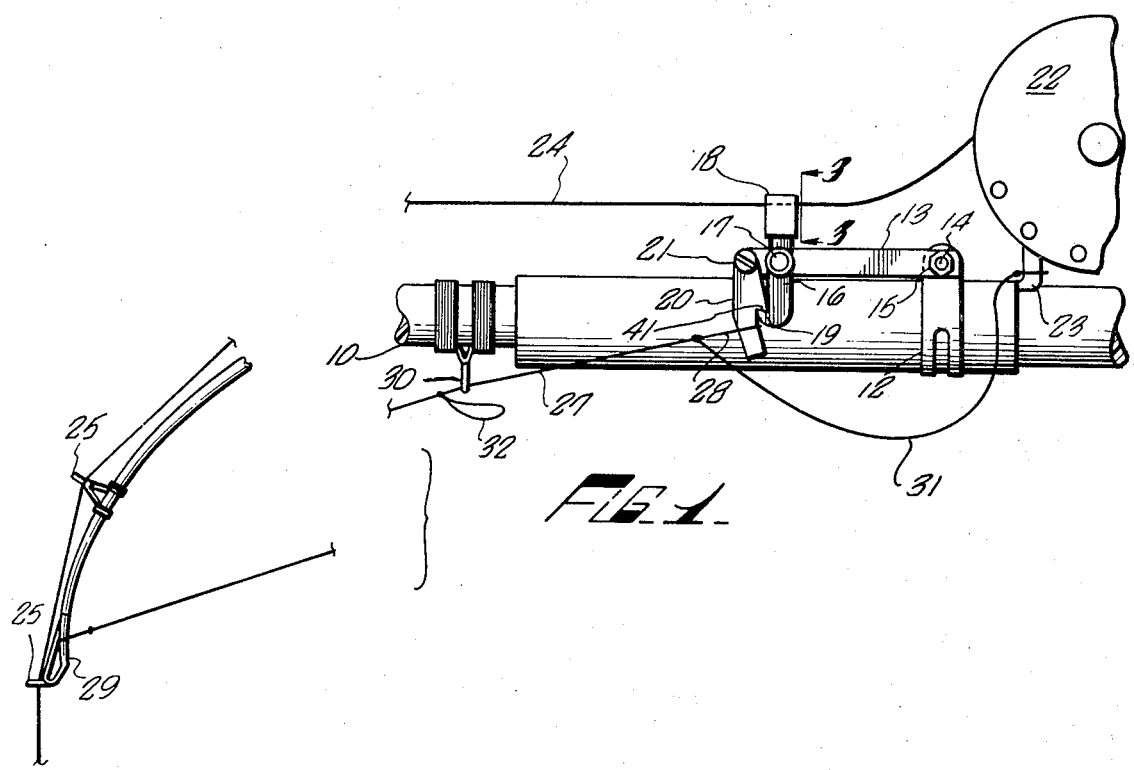
FIG. 1 is a side view showing the invention installed upon a fishing pole.

Referring now more particularly to the drawings, the numeral 10 indicates a conventional fishing pole with the device fastened thereto by means of a hose clamp 12. An arm 13 is carried by the screw extension 14 of the hose clamp 12 and is secured thereto by nuts 15 and 15a. A clamping nut 11 fastens the clamp 12 to pole 10. An arm 16 is pivotally mounted on the arm 13 by a knurled adjusting screw 17 and its upper end carries a slitted rubber block 18 while its lower end is bent forward to form a jaw 19. Farther along the arm 13 an arm 20 is pivoted as by screw 21. The arm 20 is notched to form a jaw 41.

A reel 22 is shown mounted on the pole 10 by a conventional reel support 23. A fishing line 24 is carried by the reel 22 and extends along the upper side of pole through conventional fairleads or guides 25. The line 24 passes through slit 26 in rubber block 18 as indicated in FIG. 1. A second line 27 has a loop 28 on one end and the other end is affixed in the grommet 29 on the end of the pole. The loop 28 is normally looped over the free end of arm 20, as shown in FIG. 1. The line 27 may pass through a fairlead 30 to assure the pole bending in the proper direction. A retaining line 31 is tied to line 27 and may conveniently be tied to the reel support 23, as shown in FIG. 1. A loop 32 may be tied on line 27 if it is desired to shorten it and give a greater reaction.

Figure 2:
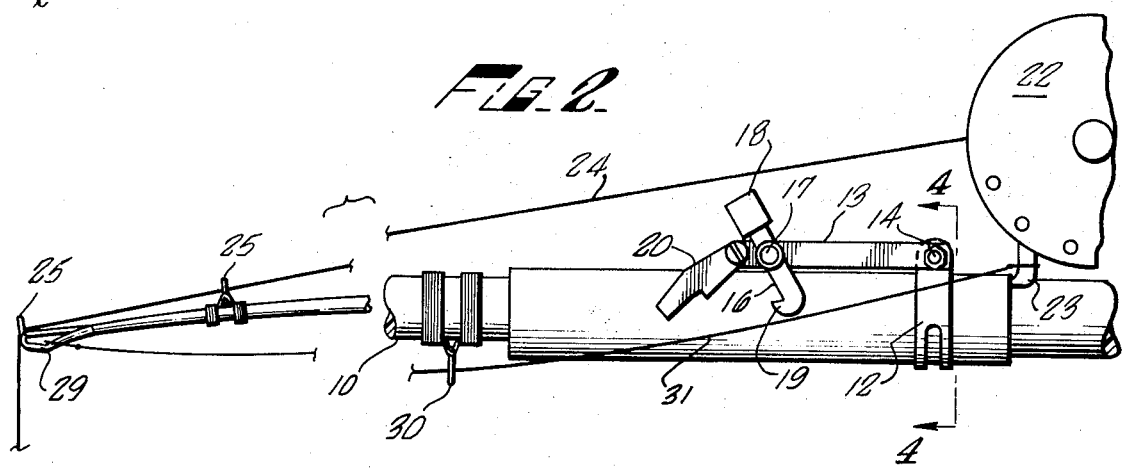
FIG. 2 is a view similar to FIG. 1 showing the invention after tripping.
Figure 4:
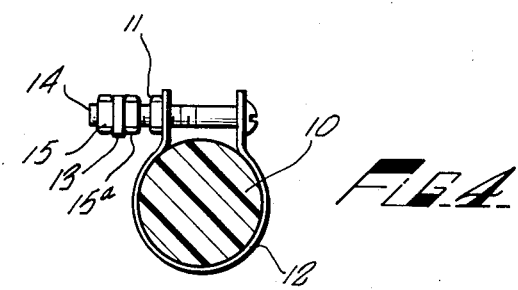
FIG. 4 is an end elevation taken along the line 4—4 of FIG. 2.
Figure 3:
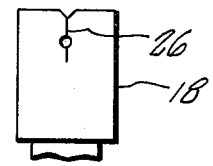
FIG. 3 is a view taken along the line 3—3 of FIG. 1.

The operation of the above-described mechanism is as follows:

The fishing line 24 is passed into slit 26 of block 18. The loop 28 is passed over the free end of arm 20 and the two arms 16 and 20 are pivoted together to engage the jaws 19 and 41 as shown in FIG. 1. Passing the loop 28 over the arm 20 puts tension on the line 27 which causes the pole 10 to be bent, as shown in FIG. 1. A fish pulling on line 24 will cause that line to pull out of slit 26 in block 18. The arm 16 will pivot counterclockwise freeing jaw 19 from jaw 41 and allowing loop 28 to slip off of arm 20. The end of pole 10 thus released, will spring up as shown in FIG. 2, thus setting the hook carried by line 24 in the fish's mouth. This action is much more reliable than human reaction and greatly increases the number of fish caught per strike.

The amount of tension necessary to trip the jaws may be adjusted by use of the knurled screw 17.

While there has been described what is at present the preferred embodiment of the invention, it will be understood by those skilled in the art that various changes and modifications can be made therein without departing from the essence of the invention.

What is claimed is:

1. A hook-setting attachment for a fishing pole comprising:
   a. a tension line having one end attached to the outer end of the pole and its other end releasably held by release means mounted rearwardly on the pole to provide tension to bend the pole;
   b. means on said release means for releasably engaging and restraining a fish line and for releasing said fish line when a fish strikes whereby said release means upon release of said fish line releases said tension line attached to said pole to permit said pole to spring up and set the hook.

2. A device as set forth in claim 1 in which said release means comprises a pair of pivoted jaws normally engaging each other with said other end of said tension line releasably attached to one of said jaws and with said fish line releasably attached to the other of said jaws.

3. A device as set forth in claim 1 in which said release means is supported by an arm which extends along one side of said pole.

4. A device as set forth in claim 2 in which one of said jaws is pivotally supported between its ends, one end of the jaw bearing a fish line retaining block.

5. A device as set forth in claim 4 in which said block is formed in a rubber-like substance and has a slit for receiving said fish line.

6. A device as set forth in claim 4 in which the other of said jaws has looped over its free end a loop formed in said other end of said tension line.

7. A device as set forth in claim 2 in which a clamp is provided for said fishing pole upon which an arm swivels and said jaws are pivotally supported from said arm, one of said jaws being supported intermediate its ends, one end of the jaw bearing a fish line retaining rubber-like block containing a slit for receiving said fish line, the other of said jaws having looped over its free end a loop formed in said tension line.

8. A device as set forth in claim 7 including means for adjusting the tension in said tension line.

* * * * *